United States Patent Office

3,669,716
Patented June 13, 1972

3,669,716
HIGH ENERGY CURING OF PHOTOPOLYMERIZ-ABLE NONAIR INHIBITED POLYESTER RESIN COATINGS
Alex C. Keyl, Walnut Creek, Calif., and Mary G. Brodie, Chicago, Ill., assignors to The Sherwin-Williams Company, Cleveland, Ohio
No Drawing. Continuation-in-part of application Ser. No. 701,023, Dec. 5, 1967, now Patent No. 3,511,687, which is a continuation-in-part of application Ser. No. 360,359, Apr. 16, 1964. This application May 11, 1970, Ser. No. 36,414
The portion of the term of the patent subsequent to May 12, 1987, has been disclaimed
Int. Cl. B44d 1/50
U.S. Cl. 117—62
16 Claims

ABSTRACT OF THE DISCLOSURE

Photopolymerizable nonair inhibited polyester resin coatings having a thickness of 1 to 12 mils (0.001 to 0.012 inch), preferably containing a photosensitizer, are cured by subjecting them to light waves within the range of 1850 to 4000 angstroms. The process is useful in forming coatings on metal, wood or other substrate but is especially valuable for producing cured resinous coatings on wood, e.g., plywood panel.

---

This application is a continuation-in-part of United States application Ser. No. 701,023 filed Dec. 5, 1967, now U.S. Pat. 3,511,687, which is a continuation-in-part of United States application Ser. No. 360,350 filed April 16, 1964, now abandoned.

BACKGROUND OF THE INVENTION

Infusible polyester resins are formed by curing a composition comprising one or more polymers of polycarboxy organic compounds and polyhydroxy organic compounds together with a monomer containing ethylenic unsaturation, usually styrene. Thus, a general type of polyester resin might be made by reacting propylene glycol, maleic anhydride, phthalic anhydride and styrene. The styrene acts as a solvent and also copolymerizes when the resin is cured. This type of polyester resin, however, is air-inhibited and is unsuitable for the practice of the present invention.

A basic deterrent to the use of polyesters in the coatings field has been the difficulty of obtaining practical cure rates at low temperatures, particularly as required in finishing wood and other heat sensitive substrates.

Catalyst systems employing peroxides with inhibitors and stabilizers to prevent permature gelling of polyester finishes have been developed in the prior art. Practical catalyst systems have been a compromise between pot life and curing time. Catalysts have been developed for curing both at room temperature and under low temperature baking conditions.

OBJECTS

One of the objects of the present invention is to provide a new and improved method for producing cured polyester resin coatings of predetermined substantial thickness which are mar-resistant, scratch-resistant and solvent-resistant.

A further object is to provide a new and improved method for producing polyester resin coatings of the type described quickly and without excessive heating.

A more specific object is to produce wooden panels coated with coatings 1 to 12 mils thick which are mar-resistant, scratch-resistant and solvent-resistant. Other objects will appear hereinafter.

BRIEF SUMMARY OF THE INVENTION

In accordance with the invention it has been found that new and improved results in the coatings art can be obatined in preparing coatings having a thickness of 1 to 12 mils (0.001 to 0.012 inch) by forming such coatings on a substrate from photopolymerizable nonair inhibited polyester resins, preferably containing a photosensitizer, and curing such resins by subjecting them to light waves within the range of 1850 to 4000 angstroms. The process is useful in forming coatings on metal, wood or other substrate but is especially valuable for producing cured resinous coatings on wood, e.g., plywood panels.

DETAILED DESCRIPTION OF THE INVENTION

The resins which are effective for the purpose of this invention are all characterized by the fact that they are not inhibited by air or oxygen. They can also be described as air drying polyesters. These resins, because of their chemical composition, are capable of achieving good surface cure in the presence of air or oxygen. Examples of the chemical types involved include allyl ether resins, benzyl ether resins, tetrahydrophthalic anhydride resins, endomethylene tetrahydrophthalic anhydride resins, cyclopentadiene modified resins, acetal resins, polyalkylene fumarate resins where there are at least three ethylene groups, and tetrahydrofurfuryl resins.

The nonair inhibited polyesters employed in the practice of this invention can also be described as air drying unsaturated polyesters. Air drying unsaturated polyesters which are employed in this invention to produce polyester coatings are especially modified to prevent air inhibition of cure.

Various groups can be introduced into the polyester most of which are subject to auto-oxidation and thus actively prevent the inhibiting action of atmospheric oxygen which is normally dissolved at the surface of polyester coatings exposed to air. Examples of groups which may be introduced into the polyester formulation include aliphatic, cycloaliphatic and aromatic ethers, e.g., trimethylol propane (TMP) diallyl ether, tetrahydrofurfuryl alcohol, dioxane, dicyclopentyl ethers, TMP monobenzyl ether, and triethylene glycol; acetal type structures; cyclohexene type compounds, e.g. tetrahydrophthalic anhydride, and endomethylene tetrahydrophthalic anhydride; dicyclopentadiene derivatives such as 8-oxytricyclodecene-4-$(5,2,1,0^{2,6})$, and tricyclodecane-$(5,2,1,0^{2,6})$ dimethylol; and by direct modification with cyclopentadiene or dicyclopentadiene.

Allyl ethers useful in the preparation of unsaturated polyesters for the purpose of incorporating allyl substituent groups in the polyester molecule include monohydric and/or polyhydric ether derivatives of polyhydric alcohols and allyl glycidyl ether. These compounds may be substituted for from 5 to 50% of the glycol equivalents in an unsaturated polyester formulation depending to a certain extent upon the number of allyl groups per mole of the particular allyl ether(s) used.

The dicarboxylic acid component of this type of formulation may be characterized by a maximum ratio of unsaturated to saturated acid of 95 to 5 and a minimum ratio of 10 to 90 with a preferred range of between 75 to 25 and 25 to 75, respectively. The strongest cured films are obtained when the unsaturated acid content is greater than 50% of the total dicarboxylic acid component of the polyester.

Dicarboxylic acids illustrative of those often used in preparing unsaturated polyesters suitable for the purposes of this invention include maleic acid, fumaric acid, maleic anhydride, etc. Though fumaric acid is, perhaps, preferred, other dicarboxylic acids substituted therefor in whole or in part include itaconic acid, citraconic acid, mesaconic acid, aconitic acid and the other less common dicarboxylic acids as mentioned in the polyester art.

Other dicarboxylic acids can be used in partial replacement for the unsaturated class described above, and included are phthalic anhydride, phthalic acid, Nadic anhydride, tetrahydrophthalic anhydride, adipic acid, azelaic acid, etc.

Aromatic dicarboxylic acids and those of even greater acid functionality (e.g., mellitic anhydride), though containing double bonds in the nucleus, do not undergo addition reactions as do the preferred class of dicarboxylic acids (fumaric). From the above and the state of the art, it is clear that mixtures of polyfunctional acids or their anhydrides are often employed to produce unsaturated polyesters resins, and these modifications are generally useful for our purposes.

Ethylene glycol and diethylene glycol are most often selected as primary reactants with the foregoing polyfunctional acids to form useful polyesters. Obviously, however, other dihydric alcohols and polyhydric alcohols of greater functionality are known to be useful.

When polyfunctional modifiers are employed, illustratively, pentaerythritol, malic acid, etc., they may constitute from 5 to 12% of the total equivalents present in the polyester. The use of a polyfunctional modifier influences the ratio of acids chosen. For example, where pentaerythritol has been used as the polyfunctional modifier, the preferred acid ratio is often at about equal parts of fumaric acid and tetrahydrophthalic anhydride.

Esterification of the alcohol components present in the reactive mixture in the formation of unsaturated polyesters is carried out in the conventional manner at a temperature of from about 300° to 450° F. to an acid value of from 5 to 50. To compensate for loss of polyhydric alcohol component during processing, a small molar excess over theory of hydroxyl equivalents is included initially in the reaction at the rate of from 5 to 20 percent excess over stoichiometric hydroxyl equivalents. After the desired acid value has been reached, the mass is allowed to cool to a temperature at which it may safely be dissolved in styrene and/or other ethylenically unsaturated monomer(s). Compounds containing allyl ether groups may also be included at this point as part of the polyester solvent. The reduction of the polyester with monomer is often to the extent that the monomer constitutes from 20 to 60% by weight of the thinned polyester product. Ethylenically unsaturated monomers other than styrene may be used in the practice of this invention. Most frequently used are monomers containing reactive vinyl groups including vinyl toluene, dibutyl fumarate, diethyl maleate, 2-ethyl hexyl acrylate, diallyl phthalate, diallyl maleate, methyl methacrylate, acrylonitrile, vinyl pyrrolidone, divinyl spirobi, triallyl citrate, ethylene glycol dimethacrylate, etc.

The following are examples of preferred constituents for providing reactive sites in the polymer: trimethylolpropane diallyl ether; trimethylolpropane monoallyl ether; diallyl pentaerythritol; allyl glycidyl ether; allyl glycerol ether; allyloxy propanol; pentaerythritol dibenzyl ether; TMP monobenzyl ether; triethylene glycol or higher homologues; tetrahydrofurfuryl alcohol; dioxane; acetal made from 1,2,6-hexane-triol and formaldehyde, 2-vinyl 1,3-dioxolane (hexanetriol and acrolein) and diallylidene pentaerythritol; dicyclopentadiene; endomethylene tetrahydrophthalic anhydride; TCD Alcohol E [8-oxytricyclodecene-4-($5,2,1,0^{2,6}$)]; TCD Alcohol DM [tricyclodecane ($5,2,1,0^{2,6}$) dimethylol; and tetrahydrophthalic anhydride.

Conventional catalyst systems are for the most part inoperable to cure polyester resins at low temperatures because it is impossible to obtain a cure at room temperature. Catalysts most frequently used to effect the heat conversion of unsaturated polyester resins consist mainly of peroxide initiators. Peroxide initiators include benzoyl peroxide; 2,4-dichlorobenzoyl peroxide; methyl ethyl ketone peroxide; cyclohexanone peroxide; cumene hydroperoxide; bis(para-bromobenzoyl) peroxide; bis(phthalyl) peroxide; bis(acetyl) peroxide; tertiary-butyl hydroperoxide; ethyl peroxydicarbonate; di-isopropylene ozonide; peracetic acid, etc.

Other additives may be and normally are included with the initiator to increase pot life of unsaturated polyesters by inhibiting polymerization. One class of agents called "retardants" accomplishes this end by inhibiting or suppressing free-radical formation. Illustrative of such retardants are alpha methyl styrene and aromatic nitro compounds. A second class of agents, illustratively quinones and salts of substituted hydrazines, often referred to as "stabilizers" are preferred over "retardants" because the former increase the pot life of the resin at room temperature but lose their retardant quality at elevated temperatures.

Special low temperature catalytic systems have been developed to cure polyester resins but their use necessarily results in polyesters having a short pot life, a deterrent factor in their commercial use. For low temperature curing, unsaturated polyester formulations usually employ, in addition to the aforementioned ingredients, a component which activates the peroxide initiator and promotes faster cure than would otherwise result at low temperature. Examples of activators used for this purpose include metallic driers, illustratively—cobalt naphthenate, oxides and hydroxides of barium, strontium, magnesium and calcium; phosphines; triethanolamine and triisopropanolamine, etc., dimethylaniline, etc.

In the practice of this invention it is preferable to use a photosensitizer. Catalytic agents which increase the photosensitivity of polyesters are known. A photosensitizer of polymerization or photopolymerization catalyst absorbs light and with the energy so acquired dissociates into free radicals. Liberated free radicals have sufficient energy to initiate polymerization. Early photosensitizers were mercury in copolymerizing ethylene and butadiene; cadmium, ammonia, and uranium salts to polymerize ethylene; triethyl lead acetate, iron and chromium and aluminum salts to promote polymerization of liquid monomers. Benzoyl peroxide, acetone, chloral hydrate and certain dyestuffs including azo compounds have been found effective to induce photopolymerization. Carbonyl compounds, including benzophenone and benzaldehyde, are reported to be active. Acyloins and organic compounds having a vicinal carbonyl group have been reported as active. Acyloin ethers have been reported as being more active than acyloins. Allyl hydroperoxide is said to be commercially feasible for such end use. Organic compounds having two or more halogens on the same carbon atom, hexachloroethanes, alkyl iodides in the presence of mercury and 2-position substituted naphthalenes, 2,7-dichloro-diphenylene sulfone, aryl and alkyl disulfides are reported photoactive, the aryl class said to possess higher activity.

Patents disclosing specific photochemically active catalysts include U.S. 2,236,736, 2,505,067, 2,505,068, 2,548,685, 2,579,095, 2,754,210, 2,809,182, 2,809,183, 2,951,758 and 3,326,710. The foregoing prior art is incorporated herein to the same extent as though it were set out in full.

It is preferable to use as a photosensitizer a mixture of 2-naphthalene sulfonyl chloride and 1-chloromethyl naphthalene as disclosed in U.S. Pat. 3,326,710.

The quantity of photosensitizer used depends on the type of resin but is preferably a minimum of 0.01% by weight of the resin and usually does not exceed 5% by weight. A preferred range is 0.6 to 2%.

The irradiation used to photopolymerize the previously described photopolymerizable resins can be generated from several different types of lamps, e.g., (a) a 275 watt Type RS sunlamp which generates light continuously in the range of 2800–3800 angstroms; (b) a xenon flash lamp operating at 800–820 volts at 900–1125 microfarads which generates light in flashes in the range of 2700–3500 angstroms; (c) a 1200 watt mercury vapor lamp with getter which generates light continuously in the range of 2200–3660 angstroms; (d) a 1030 watt mercury vapor lamp with getter which generates light in pulses of a peaked nature, with pulses occuring each $\frac{1}{120}$ of a second; (e) a non-peaking 1200 watt (100 watt/inch for 12 inches) mercury vapor lamp which generates light continuously in the range of 2200–3660 angstroms; and (f) a non-peaking 5000 watt (240 watt per inch for 21 inches) mercury vapor lamp which generates light continuously in the range of 2200–3660 angstroms.

The type (a) lamp gives the combined output from an incandescent tungsten filament operated at 275 watts and a mercury discharge lamp operated at 100 watts. The input to the lamp is 60 cycle sinusoidal voltage so that the lamp current reverses polarity 120 times per second. There is a substantial current in the lamp and light output from the lamp for over 90% of each cycle.

The type (b) lamp is based on a four turn, one inch diameter, quartz helix which is filled with xenon at a small fraction of atmospheric pressure. The lamp is energized in single pulses by discharging a 225 to 1225 mfd. capacitance, charged to approximately 1000 volts, through the lamp. The light is emitted in single pulses of 0.6 to 1.6 milliseconds duration which are followed by another pulse in 10–30 seconds.

The type (c) lamps are quartz tubes about one inch in diameter which are filled with sufficient mercury to give about 20 volts drop per inch of tube length and dissipate about 100 watts per inch of tube. These lamps can be operated conventionally using standard ballast transformers to limit current.

The type (d) lamps are similar to the type (c) lamps except a peaking operation is accomplished by employing a capacitor discharge through a magnetically saturated autotransformer and the mercury lamps. This produces 120 pulses per second, which are approximately 0.5 millisecond long. Accordingly, the maximum current during the pulses is over ten times the average lamp current and there is appreciable current during less than 15% of each cycle. Since the lamp emits light only when current flows appreciable light is emitted during less than 15% of each cycle. Alternate current pulses are of opposite polarity.

The type (e) and (f) lamps are similar to type (c).

Evaluations were made on test panels four inches square (16 sq. inches) or four by six inches (24 sq. inches). Wooden substrate, cellophane substrate and metal substrate were used.

Reflectors were used with the lamps to direct the light to the test panels.

The resin solutions were coated on the test panels to thicknesses of 1 to 12 mils, usually 2–4 mils and the coated panels were subjected to irradiation from lamps of the type previously described. The principal objective was to obtain a cured resin coating which would resist acetone for at least one hour and which was mar-resistant and scratch resistant. Another objective was to accomplish this without applying heat other than would normally be present, while maintaining ordinary atmospheric conditions. A very important objective was to obtain a cure in a minimum amount of exposure time, preferably one minute or less.

In one series of tests, using allyl ether polyester resins of the type hereinafter described mixed with styrene on 4″ x 6″ wooden panels the amount of light energy at the surface of the resin coating required to cure was calculated to be a minimum of 2 joules per square centimeter for a type (a) lamp, the exposure time being ten minutes at ten inches distance; with a type (b) lamp, 18.3 joules per cm.$^2$ was used, the distance from the lamp to the coating being 4.5 inches and the exposure time 0.33 second (330 flashes); with a type (c) lamp 7.2 joules per cm.$^2$ were used, at a distance of six inches for 45 seconds; with a type (d) lamp 10.2 joules per cm.$^2$ were used, the distance was 6 inches and the time one minute; with a type (e) lamp, 6.3 joules per cm.$^2$ were used, at 6 inches distance and a cure time of 37 seconds; and with a type (f) lamp, 5.8 joules per cm.$^2$ were used, at 5.5 inches distance and an exposure of 20 seconds. The lamp intensities in watts per cm.$^2$ for (a), (b), (c), (d), (e) and (f) lamps were 0.0034, 55.0, 0.16, 0.17, 0.17 and 0.29 respectively.

From the foregoing data, the light energy should be a minimum of 2 joules/cm.$^2$ at the coating surface and preferably at least 4 joules/cm.$^2$. Other factors affecting the speed of cure and the total energy required are the spectral output and the chemical system involved.

In U.S. applications Ser. Nos. 360,359 and 701,023, which are incorporated herein by reference, a more detailed description is given of the use of the type (b) lamp which will not be repeated in detail here. Two lamp units are described: (a) a 3000 volt unit that flashes every 30 seconds, and (b) a 1000 volt unit of five lamps, where a lamp flashes every other second. The input in watt seconds per flash multiplied by the number of flashes gives the total watt seconds, which is a measure of the total energy required for cure. This was determined empirically to be a minimum of 50,000 watt seconds. Since the efficiency is at least 60%, the minimum total in terms of output would be at least 30,000 watt seconds. In most cases the input energy for cure preferably is at least 100,000 watt seconds.

Non-air inhibited polyester resin films are most effectively cured by sources of light radiation when placed within the zone of greatest influence of said light source. The lamp should be focused as nearly as possible on the nonair inhibited polyester coating film with light rays impinging at right angles to the surface of the film. Light density is increased and therefore curing time is decreased by moving close to the light source. Operating distances between the various lamps and the surface of articles coated with unsaturated polyester coatings employed in the embodiment of the invention is from 2 to 25 inches with a preferred distance of 4–12 inches.

Air-drying unsaturated polyester resins deposited as films on wood or pressed wood fibre board, etc., tend to form air bubbles and cure is inhibited. Primers provide a preferred method of ovecoming these latent defects. Primers of the lacquer type are preferred because they dry principally by solvent evaporation and are particularly adaptable to fast production schedules. Slower drying primers may be used; illustratively those containing drying oils which dry by oxidation, so long as they effectively seal and separate the substrate from the polyester coating. Primers may either be clear or pigmented, active or nonactive.

In the preferred practice of this invention, a primer is employed usually of the lacquer class containing a resin or binder which dries by solvent evaporation. Nitrocellulose and solvent solutions of the vinyl polymer class (Vinylite VAGH) in solution are used as the binder phase. These primers sometimes contain an organic peroxide, for example, methyl ethyl ketone peroxides, cyclohexanone peroxide, etc. When so formulated, the primers are referred to herein as "active ground coats." From 1% to about 9% of organic peroxide by weight of the primer is used in active ground coat formulations.

When the nonair inhibited polyester coating has been applied over a wood or other substrate primed with an active ground coat, preliminary low heat treatment is effective to reduce the amount of light radiation required for final curing of the film. Heat treatment promotes the escape of entrapped air, and solvents, and may initiate decomposition of peroxide catalyst. Temperatures of from 140° to 250° F. applied over a period of from 5 to 15 minutes provide sufficient preliminary heat treatment yet is not injurious to heat sensitive substrates. Low level heat treatment may be applied either before, during, or both before and during, but preferably before photopolymerization by baking or under infrared heat radiation from infrared lamps.

The use of heat and active ground coats for curing polyester coatings is old in the art and not considered novel apart from combination with high intensity lamp treatment. The invention is directed to the use of intense light radiation as described for curing non-air inhibited polyester coatings and is capable of causing completely cured polyester films upon exposure of the order of seconds to full intensity of total light exposure. Active ground coats and low level heat treatment as described and exemplified herein are not alone capable of curing polyester coatings catalyzed for light sensitivity. However, they are used in combination with light radiation to reduce the total light radiation time required to obtain completely cured polyester coatings.

The following examples illustrate the curing of photopolymerizable polyester coatings according to the principles of this invention. The polyester resins and photosensitizers employed are to be construed as illustrative, but not as limitations:

EXAMPLE I

Preparation of 30% diallyl PE (pentaerythritol) diethylene maleate phthalate

|  | Weight, gms. |
|---|---|
| (I) Maleic anhydride | 441 |
| (II) Phthalic anhydride | 222 |
| (III) Diethylene glycol | 490 |
| (IV) Diallyl PE | 428 |
| (V) Sulfonated styrene-divinyl benzene polymer (Dowex 50) | 14.6 |
| Total charge | 1595.6 |

Ingredients I, II and III were charged to a 3 liter flask fitted with a water cooled condenser and separatory trap and heated gradually to 360° F. with agitation. 86 grams of toluene were added for refluxing and a light nitrogen blanket was introduced and maintained throughout the reaction. The temperature was held at 360° F. After the acid value had dropped to 141–142, ingredients IV and V were added. The batch was reheated to 360° F. and held for a final acid value of 37–39. At a late stage in the reaction the azeotrope solvent (toluene) was removed by blowing with nitrogen. At an acid value of 37–39, the polyester resin was cooled and reduced with styrene to produce a final solution of 75% resin and 25% styrene. The final resin had an acid value of 38.6 and a viscosity of W—. Tertiary butyl hydroquinone was added as inhibitor at a concentration of 100 parts per million based on the weight of the total solution.

EXAMPLE II

Preparation of 30% diallyl PE ethylene maleate phthalate

|  | Weight, gms. |
|---|---|
| (I) Maleic anhydride | 441 |
| (II) Phthalic anhydride | 222 |
| (III) Ethylene glycol | 285 |
| (IV) Diallyl PE | 428 |
| (V) Sulfonated styrene-divinylbenzene polymer (Dowex 50) | 12.7 |
| Total charge | 1388.7 |

This resin was prepared in the same manner as Example I except that the addition of IV and V was made at an acid value of 173–176. The completed resin was reduced with styrene to produce a resin solution containing 25% styrene and 75% polyester resin. The final resin solution had a viscosity of $Z_1^+$ and an acid value of 37.4. Inhibitor was added as in Example I.

EXAMPLE III

Preparation of TMP (trimethylolpropane) monoallyl ether diethylene maleate phthalate

|  | Weight, gms. |
|---|---|
| (I) Maleic anhydride | 588 |
| (II) Phthalic anhydride | 296 |
| (III) Diethylene glycol | 746 |
| (IV) TMP monoallyl ether | 306 |
| Total charge | 1936 |

Ingredients I, II and III were charged to a 3 liter flask fitted with a water cooled condenser and separatory trap and heated gradually to 360° F. with agitation. 67 grams of toluene was added for refluxing and a light nitrogen blanket was introduced and maintained throughout the reaction. The batch was held at 360° F. for an acid value of 100 and the addition of ingredient IV. Upon the addition of IV, the batch was reheated to 360°–392° F. and refluxing continued until in the late stage of the reaction the azeotropic solvent (toluene) was removed by blowing with nitrogen. Temperatures of 360°–392° F. were held for a final acid value of 20–22. The completed resin was reduced with styrene with inhibitor added in the same proportions as in the previous examples. The reduced resin had a viscosity of $Z_1$ and an acid value of 21.2.

EXAMPLE IV

A liquid unsaturated polyester coating composition was prepared by blending the ingredients listed below:

|  | Weight, gms. |
|---|---|
| Polyester prepared according to Example II | 100 |
| Styrene monomer | 40 |
| Silicone solution [1] | 2 |
| Non-drying capric acid alkyd | 2 |
| 1-chloromethyl naphthalene | 1.4 |
| 2-naphthalene sulfonyl chloride | 1.4 |
| Total | 146.8 |

[1] 1% silicone oil (Linde R–12) reduced in styrene monomer.

The above polyester blend was flow coated onto several wooden (maple) 4" x 6" panels primed with a primer or active ground coat as shown in Table I. After coating with polyester, the panels were aged at room temperature (or heat treated) prior to light irradiation with a type (b) lamp as shown in the table. The distance between the panels and the helical quartz flash tube during light irradiation was measured at 10 inches.

A capacitance of 350 microfarads connected to a 3,000 volt power source was used to operate the flash tube at a power input of approximately 1,600 watt seconds per flash. Duration of each flash was of the order of 2 milliseconds and the off time between flashes was from 25 to 30 seconds.
Ambient temperature under the flash tube was 84° F.

TABLE I

| Panel No. | Primer | Pretreatment | Flashes | Results |
|---|---|---|---|---|
| $A_1$ | Active ground coat.[1] | Aged 4 min. at room temp. heat treatment for 3-4 min., at 201° F. | 20 flashes or about 0.04 sec. light exposure. | Slightly tacky but fairly hard film |
| $A_2$ | do | Heat treatment 7 min. at 195° F. and aged 3 min. at room temp. | 40 flashes or about 0.08 sec. light exposure. | Film harder than $A_1$. Very little tack. |
| $A_3$ | Primer [2] | Heat treatment 5-6 min. at 200° F. | 20 flashes or about 0.04 sec. light exposure. | Surface skin formed. Film not cured underneath. |
| $A_4$ | Active ground coat. | Aged 19 min. at room temp. | do | Surface cure. Film gel-like and soft. |

[1] See the following table:

| | Percent |
|---|---|
| 60% solution of methyl ethyl ketone peroxide in dimethyl phthalate (Lupersol DDM) | 6.5 |
| Vinyl chloride-vinyl acetate copolymer (Vinylite VAGH) | 13.2 |
| Solvent: Xylene, methyl isobutyl ketone 2nd ethyl amyl ketone | 80.3 |
| Total | 100.0 |

[2] See the following table:

| | Percent |
|---|---|
| Vinylite VAGH | 15.0 |
| Solvent: Xylene and methyl isobutyl ketone | 85.0 |
| Total | 100.0 |

The various panels listed in Table I which were subjected to heat treatment did not evidence any cure until exposure to light radiation. As shown in Table I, light radiation alone was effective to partially cure the untreated panel, $A_4$, at low temperature (approximately 84° F.) but additional light flashes would have been necessary to obtain a complete cure. Panel $A_1$ illustrates that a more complete cure may be obtained with equivalent light flashes by employing an active ground coat plus heat treatment. As shown by panel $A_2$, a minimum of 40 flashes was required for effective cure. At an energy input per flash of 1575 watt seconds the total energy used was 63,000 watt seconds. Heat treatment alone without the use of an active ground coat, is not effective as shown by the panel $A_3$ data. In addition, data contained in Table I illustrates the effect of increased light exposure upon the cure of polyester coatings.

EXAMPLE V

| | Weight, gms. |
|---|---|
| Polyester prepared according to Example I | 67.00 |
| Polyester prepared according to Example II | 33.00 |
| Styrene monomer | 35.00 |
| Silicone solution [1] | 2.00 |
| Non-drying capric acid alkyd | 2.00 |
| 1-chloromethyl naphthalene | 2.03 |
| 2-naphthalene sulfonyl chloride | 2.03 |
| Total | 143.06 |

[1] 1% silicone oil (Linde R-12) reduced in styrene monomer.

The above ingredients were thoroughly mixed to obtain a liquid polyester coating. A wet film of the coating thus prepared was deposited on a wooden panel which had been primed with an active ground coat as in Example IV. Pre-treatment of the coated panel consisted of baking in an oven for five minutes at 212° F. Thereafter the panel was placed 10 inches from the flash tube light source and subjected to light radiation as in Example IV. The flash tube was switched on immediately and the panel exposed to forty flashes of intense light radiation.

After exposure to the described light radiation, the polyester coating was found to be hard with no after tack. Hardness of the film increased somewhat thereafter, indicating cure process continued after removal from the high intensity light source.

EXAMPLE VI

| | Weight, gms. |
|---|---|
| Polyester prepared according to Example III | 100 |
| Styrene monomer | 40 |
| Silicone solution | 2 |
| Non-drying capric alkyd | 2 |
| 1-chloromethyl naphthalene | 1.4 |
| 2-naphthalene sulfonyl chloride | 1.4 |
| Total | 146.8 |

A polyester coating was prepared by thoroughly mixing the above ingredients. The completed polyester coating was flow coated on a wooden panel primed with an active ground coat as in Example IV. The coated panel was heat treated for five minutes in an oven at 212° F. Exposure to light radiation immediately followed heat treatment and consisted of 40 flashes at a distance of 10 inches from the flash tube described in Example IV.

The resulting cured polyester film was fairly hard and had no after tack. Additional hardening of the film was obtained on aging.

EXAMPLE VII

The resin used was diethylene-propylene maleate endomethylene tetrahydrophthalate in 46% by weight styrene with a sensitizer composed of 1% 1-chloromethyl naphthalene (CMN) and 1% 2-naphthalene sulfonyl chloride (NSC). Two percent of a 2% solution of GESF 1023 silicone was added for flow purposes. This composition was applied to a plywood panel previously coated with an active ground coat. The thickness of the resin coating was 6 mils. The coated panel was subjected to flashing light of type (b) with simultaneous infrared exposure at a distance from the lamps of 4-4.5 inches after 2 minutes air exposure and 5 minutes infrared preheat at 140° F., 450 flashes at 850 volts-1125 microfarads with simultaneous infrared. The coating was cured successfully by this treatment. It was tack-free, mar resistant and scratch resistant, the mar resistance and scratch resistance improving with aging. Adhesion was exceptional.

The active ground coat (primer) consisted of a 15% solution of a polyvinyl chloride resin (Vinylite VAGH) containing 6.35% peroxide (Lupersol DNF).

The primer did not materially affect acetone resistance.

An air inhibited resin, propylene maleate phthalate in 46% styrene did not cure to a mar-scratch resistant finish under the conditions used in Example VII.

EXAMPLE VIII

The procedure was the same as in Example VII except that the resin used was diethylene maleate endomethylene tetrahydrophthalate in 36% styrene and the film thickness was 3 mils. The film cured very satisfactorily and the cured film was very tough and flexible.

EXAMPLE IX

Preparation of 18% TMP diallyl ether diethylene fumarate azelate

| | Weight, gms. |
|---|---|
| (I) Fumaric acid | 579 |
| (II) Azelaic acid | 106 |
| (III) Diethylene glycol | 566 |
| (IV) Trimethylolpropane diallyl ether | 249 |
| Total | 1500 |

Ingredients I, II and III were charged to a 3 liter flask fitted with a stirrer, a nitrogen inlet, a water cooled condenser and separatory trap and heated gradually to 375° F. with agitation. 82 grams of xylene were added incrementally for refluxing and a nitrogen blanket was introduced and maintained throughout the reaction. The temperature was held at 375° F. After the acid value had dropped to 85-90, ingredient IV and 0.15 gram of hydroquinone were added.

The reaction mixture was reheated to 375° F. and held for a final acid value of 30. The azeotropic solvent (xylene) was then removed by blowing with nitrogen. The polyester resin was cooled and reduced with styrene to produce a final solution of 75% resin and 25% styrene. The final resin had an acid value of 19.4 and a viscosity of W. Tertiary butyl hydroquinone was added with the styrene as an inhibitor at a concentration of 100 parts per million based on the weight of the total solution.

EXAMPLE X

Preparation of 9% TMP diallyl ether diethylene fumarate azelate

| | Weight, gms. |
|---|---|
| (I) Fumaric acid | 616 |
| (II) Azelaic acid | 113 |
| (III) Diethylene glycol | 644 |
| (IV) Trimethylolpropane diallyl ether | 136 |
| Total | 1509 |

Ingredients I, II and III were charged to a 3 liter flask fitted with a stirrer, a nitrogen inlet, a water cooled condenser and separatory trap and heated gradually to 375° F. with agitation. 74 grams of xylene were added incrementally for refluxing and a nitrogen blanket was introduced and maintained throughout the reaction. The temperature was held at 375° F. After the acid value had dropped to 85-90, ingredient IV and 0.15 gram of hydroquinone were added. The reaction mixture was reheated to 375° F. and held for a final acid value of 24, at which time the azeotropic solvent (xylene) was removed by blowing with nitrogen. The polyester resin was then cooled and reduced with styrene to produce a final solution of 75% resin and 25% styrene. The final resin had an acid value of 18.4 and a viscosity of X. Tertiary butyl hydroquinone was added with the styrene as an inhibitor at a concentration of 100 parts per million based on the weight of the total solution.

EXAMPLE XI

Preparation of TMP monobenzyl ether diethylene furamate

| | Weight, gms. |
|---|---|
| (I) Trimethylol propane | 333 |
| (II) Benzyl alcohol | 274 |
| (III) Fumaric acid | 577 |
| (IV) Diethylene glycol | 316 |
| Total | 1500 |

Ingredients I and II along with 0.7 g. of p-toluene sulfonic acid were charged to a 3 liter flask fitted with a stirrer, a nitrogen inlet, a water condenser and a separatory trap and heated gradually to 400° F. A nitrogen blanket was introduced and maintained throughout the reaction. After nearly 2.5 moles of water had been removed, III and IV were added. The reaction mixture was reheated to 375° F. and held for a final acid value of 30. The polyester resin was cooled at that time and reduced with styrene to produce a final solution of 75% resin and 25% styrene. The final resin had an acid value of 29.5 and a viscosity of $Z_4$. Tertiary butyl hydroquinone was added with the styrene as an inhibitor at a concentration of 100 parts per million based on the weight of the total solution.

EXAMPLE XII

Preparation of PE dibenzyl ether diethylene fumarate

| | Weight, gms. |
|---|---|
| (I) Pentaerythritol | 290 |
| (II) Benzyl alcohol | 461 |
| (III) Fumaric acid | 450 |
| (IV) Diethylene glycol | 226 |
| (V) p-Toluene sulfonic acid | 1 |
| (VI) Xylene | 71 |
| Total | 1499 |

Ingredients, I, II and V were added to a 3 liter flask fitted with a stirrer, a nitrogen inlet, a water cooled condenser and separatory trap and heated gradually to 400° F. with agitation. After the dibenzyl ether of PE was synthesized, III, IV, VI and 0.08 g. of hydroquinone were added. The reaction mixture was reheated to 375° F. and held for an acid value of 26.6 at which time the azeotropic solvent (xylene) was removed by blowing with nitrogen. After that step, the polyester resin was cooled and reduced with styrene to produce a final solution of 75% resin and 25% styrene. The final resin had an acid value of 23.5 and a viscosity of $Z_1$. Tertiary butyl hydroquinone was added with the styrene as an inhibitor at a concentration of 100 parts per million based on the weight of the total solution.

EXAMPLE XIII

Preparation of triethylene propylene fumarate

| | Weight, gms. |
|---|---|
| (I) Triethylene glycol | 787 |
| (II) Propylene glycol | 67 |
| (III) Furmaric acid | 646 |
| Total | 1500 |

Ingredients I, II and III were charged to a 3 liter flask fitted with a stirrer, a nitrogen inlet, a water cooled condenser and separatory trap and heated gradually to 375° F. with agitation. A light nitrogen blanket was introduced and maintained throughout the reaction. The reaction mixture was maintained at 375° F. and held for an acid value of 30 when .15 g. of hydroquinone was added. The polyester resin was cooled and reduced with styrene to produce a final solution of 75% resin and 25% styrene. The final resin had an acid value of 27.9 and a W viscosity. Tertiary butyl hydroquinone was added with the styrene as an inhibitor at a concentration of 100 parts per million based on the weight of the total solution.

EXAMPLE XIV

Preparation of triethylene fumarate

| | Weight, gms. |
|---|---|
| (I) Triethylene glycol | 880 |
| (II) Furmaric acid | 620 |
| (III) Hydroquinone | 0.15 |
| Total | 1500.15 |

Ingredients I, II and III were charged to a 3 liter flask fitted with a stirrer, a nitrogen inlet, a water cooled condenser and separatory trap and heated gradually to 375° F. with agitation. A light nitrogen blanket was introduced and maintained throughout the reaction. The reaction mixture was maintained at 375° F. and held for an acid value of 25-30. The resin was cooled and reduced with styrene to produce a final solution of 75% resin and 25% styrene. Tertiary butyl hydroquinone was added with the styrene as an inhibitor at a concentration of 100 parts per million on weight of total solution. The final acid value was 22.7 and viscosity was V.

EXAMPLE XV

Preparation of triethylene ethylene fumarate

| | Weight, gms. |
|---|---|
| (I) Triethylene glycol | 698.6 |
| (II) Ethylene glycol | 288.8 |
| (III) Fumaric acid | 1009.2 |
| Total | 1996.6 |

Ingredients I, II and III were charged to a 3 liter flask fitted with a water cooled condenser and separatory trap and heated gradually to 360° F. with agitation. A light nitrogen blanket was introduced and maintained throughout the reaction. The temperature was held at 360° F. at an acid value of 16–18, the polyester resin was cooled and reduced with styrene to produce a final solution of 75% resin and 25% styrene. The final resin had an acid value of 17 and a viscosity of Z. Tertiary butyl hydroquinone was added as inhibitor at a concentration of 100 parts per million based on the weight of the total solution.

EXAMPLE XVI

Preparation of benzyl triethylene ethylene fumarate

| | Weight, gms. |
|---|---|
| (I) Triethylene glycol | 554.3 |
| (II) Ethylene glycol | 229.1 |
| (III) Fumaric acid | 879.8 |
| (IV) Hydroquinone | .1841 |
| (V) Xylene | 18 |
| (VI) p-Toluene sulfonic acid | .1276 |
| (VII) Benzyl alcohol | 159.6 |
| Total | 1841.1117 |

Ingredients I, II, III and IV were charged to a 3 liter flask fitted with a water cooled condenser and separatory trap and heated gradually to 360° F. with agitation. 18 grams (V) of xylene were added for refluxing and a light nitrogen blanket was introduced and maintained throughout the reaction. The temperature was held at 360° F. After the acid value had dropped to 90–92, ingredients VI and VII were added. The batch was reheated to 360° F. and held for a final acid value of 28–30. At a late stage in the reaction, the azeotrope solvent (xylene) was removed by blowing with nitrogen. At an acid value of 28–30, the polyester resin was cooled and reduced with styrene to produce a final solution of 75% resin and 25% styrene. The final resin had an acid value of 29.2 and a viscosity of U. Tertiary butyl hydroquinone was added as inhibitor at a concentration of 100 parts per million based on the weight of the total solution.

EXAMPLE XVII

Preparation of tetrahydrofurfuryl alcohol diethylene fumarate

| | Weight, gms. |
|---|---|
| (I) Diethylene glycol | 502 |
| (II) Fumaric acid | 714 |
| (III) Tetrahydrofurfuryl alcohol | 284 |
| Total | 1500 |

Ingredients I, II and III were charged to a 3 liter flask fitted with a stirrer, a nitrogen inlet, a water cooled condenser and separatory trap and heated gradually to 375° F. with agitation. A light nitrogen blanket was introduced and maintained throughout the reaction. The temperature was held at 375° F. for an acid value of 34. The polyester resin was cooled and reduced with styrene to produce a final solution of 75% resin and 25% styrene. The final resin had an acid value of 34.6 and an R viscosity. Tertiary butyl hydroquinone was added with the styrene as an inhibitor at a concentration of 100 parts per million based on the weight of the total solution.

EXAMPLE XVIII

Preparation of dicyclopentadiene propylene fumarate

| | Weight, gms. |
|---|---|
| (I) Propylene glycol | 539 |
| (II) Fumaric acid | 748 |
| (III) Dicyclopentadiene | 213 |
| Total | 1500 |

Ingredients I and II were charged to a 3 liter flask fitted with a stirrer, a nitrogen inlet, a water cooled condenser and separatory trap and heated gradually to 375° F. with agitation. A nitrogen blanket was introduced and maintained throughout the reaction. The temperature was held at 375° F. After the acid value had dropped to below 294, ingredient III and .14 gram of hydroquinone were added. The reaction mixture was reheated to 375° F. and held for a final acid value of 30. The polyester resin was cooled and reduced with styrene to produce a final solution of 75% resin and 25% styrene. The final resin had an acid value of 28.4 and a viscosity of $Z_1$. Tertiary butyl hydroquinone was added with the styrene as an inhibitor at a concentration of 100 parts per million based on the weight of the total solution.

EXAMPLE XIX

Preparation of dicyclopentadiene propylene fumarate

The ingredients and proportions were the same as in Example XVIII. Ingredients I and II were charged to a 3 liter flask equipped with a stirrer, nitrogen inlet, a water cooled condenser and separatory trap. A nitrogen blanket was started and the reaction mixture was heated to 310° F. and held for an acid value <294. Ingredient III was added slowly and allowed to reflux back into the cook while water was removed. Temperature was raised to 392° F. and held for an acid value approaching 30. Hydroquinone was added to the cooled resin at the end of the cook. The cooled resin was cut in styrene containing 100 parts per million tertiary butyl hydroquinone (on total solution at a ratio of 75/25—polyester/styrene). The resin had a viscosity of $Z-Z_1$ and an acid value of 43.5.

EXAMPLE XX

Preparation of dicyclopentadiene modified diethylene fumarate

| | Weight, gms. |
|---|---|
| (I) Diethylene glycol | 659 |
| (II) Fumaric acid | 656 |
| (III) Dicyclopentadiene | 186 |
| (IV) Hydroquinone [1] | 0.08 |
| Total | 1501.08 |

[1] 0.005%.

Ingredient I was charged, heated to 200° F. and II was added to a 3 liter flask fitted with a stirrer, a nitrogen inlet, a water cooled condenser and separatory trap; then heated gradually to 315° F. with agitation. The batch was held for an A.V. of 200. Ingredient III was added slowly and allowed to reflux back into the cook while water was removed. Temperature was raised to 392° F. and held for an acid value of 30. A light nitrogen blanket was used in the late stages of the cook. The resin was cooled to 300° F. Hydroquinone was added to the cooled resin before it was dropped into styrene containing tertiary butyl hydroquinone (100 parts per million) and 2,5-diphenyl benzoquinone (25 parts per million) on the total cut. The polyester and styrene ratio was 75/25. Final acid value was 26.8 and viscosity was U.

EXAMPLE XXI

Preparation of 8-oxytricyclodecen-4-(5,2,1,0$^{2,6}$) propylene fumarate

| | Weight, gms. |
|---|---|
| (I) Fumaric acid | 667 |
| (II) Propylene glycol | 360 |
| (III) 8-oxytricyclodecen-4-(5,2,1,0$^{2,6}$) | 473 |
| Total | 1500 |

Ingredients I, II, III and 0.15 g. of hydroquinone were charged to a 3 liter flask fitted with a stirrer, a nitrogen in let, a water cooled condenser and a separatory trap and heated gradually to 375° F. with agitation. A nitrogen blanket was introduced and maintained throughout the reaction. The reaction mixture was maintained at 375° F. and held for an acid value of 30. The polyester resin was cooled and reduced with styrene to produce a final solution of 75% resin and 25% styrene. The final resin had an acid value of 27.4 and viscosity of P. Tertiary butyl hydroquinone was added with the styrene as an inhibitor at a concentration of 100 parts per million based on the weight of the total solution.

EXAMPLE XXII

Preparation of 8-oxytricyclodecen-4-(5,2,1,0$^{2,6}$) propylene ethylene fumarate

| | Weight, gms. |
|---|---|
| (I) Fumaric acid | 682 |
| (II) Propylene glycol | 183.9 |
| (III) Ethylene glycol | 150 |
| (IV) TCD alcohol | 485 |
| (V) Hydroquinone | 0.15 |
| Total | 1501.05 |

0.1% hydroquinone was added to the resin as a stabilizing inhibitor at the end of batch. Otherwise the procedure was the same as in Example XX. The material cut in 25% styrene had a viscosity of R. The acid value was 30.2.

EXAMPLE XXIII

Preparation of hexanetriol formal propylene maleate (acetal polyester)

| | Weight, gms. |
|---|---|
| (I) 1,2,6-hexanetriol | 651 |
| (II) Paraformaldehyde | 160 |
| (III) Maleic anhydride | 24 |
| (IV) Xylene | 29 |
| (V) Propylene glycol | 185 |
| (VI) Maleic anhydride | 451 |
| Total | 1500 |

Ingredients I, II, III and IV were charged to a 3 liter flask fitted with a stirrer, a nitrogen inlet, a water cooled condenser and a separatory trap and heated gradually to 335° F. with agitation. A nitrogen blanket was introduced and maintained throughout the reaction. After 86.9 g. of water were removed, V and VI plus 33.2 g. of xylene were added. The reaction mixture was reheated to 375° F. and held for a final acid value of 30. The polyester resin was cooled and reduced with styrene to produce a final solution of 75% resin and 25% styrene. The final resin had an acid value of 27.8 and a viscosity of O. Tertiary butyl hydroquinone was added with the styrene as an inhibitor at a concentration of 100 parts per million based on the weight of the total solution.

EXAMPLE XXIV

Preparation of tricyclodecan-(5,2,1,0$^{2,6}$) dimethylol propylene fumarate

| | Weight, gms. |
|---|---|
| (I) Fumaric acid | 646 |
| (II) Propylene glycol | 223 |
| (III) Tricyclodecan(5,2,1,0$^{2,6}$)dimethylol | 562 |
| (IV) Hydroquinone | 0.05 |
| Total | 1431.05 |

Ingredients I, II, III and IV were charged to a 3 liter flask fitted with a stirrer, a nitrogen inlet, a water cooled condenser and separatory trap and heated gradually to 375° F. with agitation. A nitrogen blanket was introduced and maintained throughout the reaction. The reaction mixture was maintained at 375° F. and held for an acid value of 30. The polyester resin was cooled and reduced with styrene to produce a final solution of 75% resin and 25% styrene. The final resin had an acid value of 29.7 and a viscosity of $Z_1$. Tertiary butyl hydroquinone was added with the styrene as an inhibitor at a concentration of 100 parts per million based on the weight of the total solution.

EXAMPLE XXV

Preparation of diethylene glycol propylene glycol 3,6-endomethylen-4-tetrahydrophthalate maleate

| | Weight, gms. |
|---|---|
| (I) 3,6-endomethylene-4-tetrahydrophthalic anhydride | 634 |
| (II) Maleic anhydride | 253 |
| (III) Diethylene glycol | 359 |
| (IV) Propylene glycol | 254 |
| Total | 1500 |

Ingredients I, II, III and IV were charged to a 3 liter flask fitted with a stirrer, a nitrogen inlet, a water cooled condenser and a separatory trap and heated gradually to 375° F. with agitation. A nitrogen blanket was introduced and maintained throughout the reaction. The reaction mixture was maintained at 375° F. After an acid value of 20 had been attained, the polyester resin was cooled and reduced with styrene to produce a final solution of 75% resin and 25% styrene. The final resin had an acid value of 18.9 and a viscosity of V. Tertiary butyl hydroquinone was added with the styrene as an inhibitor at a concentration of 100 parts per million based on the weight of the total solution.

EXAMPLE XXVI

Preparation of diethylene glycol fumarate tetrahydrophthalate

| | Weight, gms. |
|---|---|
| (I) Tetrahydrophthalic anhydride | 230 |
| (II) Fumaric acid | 525 |
| (III) Diethylene glycol | 673 |
| (IV) Xylene | 72 |
| Total | 1500 |

Ingredients I, II, III and IV were charged to a 3 liter flask fitted with a stirrer, a nitrogen inlet, a water cooled condenser and a separatory trap and heated gradually to 375° F. with agitation. A nitrogen blanket was introduced and maintained throughout the reaction. The reaction mixture was maintained at 375° F. 0.18 g. of hydroquinone was added to the reaction. After the reaction mixture attained an acid value of 30, the azeotropic solvent (xylene) was removed by blowing with nitrogen. At an acid value of 25, the polyester resin was cooled and reduced with styrene to produce a final solution of 75% resin and 25% styrene. The final resin had an acid value of 24.9 and a viscosity of W. Tertiary butyl hydroquinone was added with the styrene as an inhibitor at 100 parts per million based on the weight of the total solution.

EXAMPLE XXVII 50 parts by weight of the resin of Example IX was mixed with 12.5 parts of styrene, 0.5 part of CMN and 0.5 part of NSC to form a sensitized photocuring composition which was applied to wooden panels as a uniform coating of approximately 4 mils (dry). The panels were rectangular 4" x 6" and were exposed to a type (d) 3.5 kw. mercury vapor lamp at a distance of 4 inches for 60 seconds, the panel surface temperature rising to 130° F. The resultant coating was tack-free, had good mar-scratch resistance and an acetone resistance of approximately one hour after aging one day.

EXAMPLE XXVIII

The procedure was the same as in Example XXVII except that the resin of Example X was used. The results were the same except that the coating had an acetone resistance of approximately one hour and 15 minutes after aging one day.

EXAMPLE XXIX

The procedure was the same as in Example XXVII except that the resin of Example XI was used and the photocuring composition contained in addition one part of a 2% SF1023 silicone solution in styrene to improve flow and the distance from the lamp to the coating on the wooden panel was 6 inches. The thickness of the coating was 3 to 4 mils (dry). On exposure from 60–70 seconds a tack-free coating was obtained with good mar-scratch resistance and an acetone resistance of approximately 2–4½ hours after one day.

EXAMPLE XXX

The procedure was the same as in Example XXIX except that the resin of Example XII was used and the panel surface temperature rose to around 140–145° F. At a coating thickness of 3–4 mils a tack-free coating having good mar-scratch resistance was obtained which after aging one day had an acetone resistance of 2 hours and 41 minutes and after one week an acetone resistance of one hour and 43 minutes. A coating having a thickness of 5 mils (dry) was tack-free with good mar-scratch resistance and had an acetone resistance of at least 8 hours after aging one day and at least 7 hours after one week.

EXAMPLE XXXI

The procedure was the same as in Example XXIX except that the resin of Example XVII was used. Coatings of various thicknesses were than applied to 4" x 6" wooden panels and exposed to a 3.5 kw. type (d) peaking lamp at distances of 4" and 6" from the lamp. Tack-free cured coatings with good mar-scratch resistance were obtained. The 3 mil coating (dry) had an acetone resistance of 1 hour 7 minutes after aging one day and 55 minutes after one week. The 4 mil (dry) coating had an acetone resistance of 2 hours and 49 minutes after aging one day and 6 hours and 4 minutes after one week.

EXAMPLE XXXII

A photocuring composition was prepared using the same procedure as in Example XXIX but substituting the resin of Example XXVI. 3.5 mil coatings (dry) were applied to 4" x 6" wooden panels and these panels were exposed to the light from a 3.5 kw. type (d) peaking lamp at a distance of 6" for 60 seconds with the panel surface temperature rising to 140° F. The resultant coatings were tack-free and had good mar-scratch resistance. The acetone resistance was 48 minutes after aging one day and 39 minutes after one week.

Another series of panels was coated with the same resin with coatings of 2 mils thickness (dry) and exposed to a type (e) 1.2 kw. lamp at a distance of 6" for 60 seconds with the panel surface temperature rising to 180° F. The resultant coatings were tack-free and had good mar-scratch resistance. The acetone resistance after aging one day was 2 hours and 5 minutes.

Using the same conditions except with a thickness of 4.5 mils (dry) and the panel surface temperature rising to 160° F. tack-free coatings having a good mar-scratch resistance were obtained with an acetone resistance of 48 minutes after aging one day and one hour and 5 minutes after one week.

EXAMPLE XXXIII

The procedure was the same as in Example XXXII except that the photocuring composition consisted of 60% polyester resin and 40% styrene with the addition of 0.75% CMN and 0.75% NSC based on the total composition. This composition was applied as a coating to a 4" x 6" wooden panel at various thicknesses from 1.5 to 4 mils (dry) and exposed under a type (f) 5 kw. lamp at a distance of 6" for periods of time from 5–30 seconds. A tack-free coating with good mar-scratch resistance was obtained at 15 seconds, 20 seconds and 30 seconds. The acetone resistances after aging one day were 35 minutes, 2 hours and 20 minutes and more than 2 hours and 50 minutes, respectively.

EXAMPLE XXXIV

The photocuring composition was prepared as described in Example XXIX except that the resin of Example XXII was used. This composition was applied to 4" x 6" wooden panels in a thickness of 3–4 mils (dry) and exposed to a 3.5 kw. type (d) peaking lamp at a distance of 6" for 60 seconds. Tack-free coatings having good mar-scratch resistance were obtained which had an acetone resistance of 2 hours and 26 minutes after aging one day and 4 hours and 50 minutes after one week.

EXAMPLE XXXV

The procedure was the same as in Example XXXIV except that the resin of Example XXIV was used. The photocuring composition was applied to 4" x 6" wooden panels at a thickness of 4, 8 and 10 mils wet and exposed to a type (d) 3.5 kw. peaking lamp at distances of 4" to 6" for 60 seconds with panel surface temperatures rising to 120° F.–160° F. Tack-free coatings were obtained which exhibited good to excellent mar-scratch resistance. A coating of 10 mils wet corresponded to 3.5–6 mils dry. The 10 mil coating had an acetone resitance after aging one day of 24 hours.

EXAMPLE XXXVI

A photocuring composition was prepared as described in Example XXIX using the resin disclosed in Example XIII. A coating 3 mils thick (dry) was applied to a 4" x 6" wooden panel which was then exposed at a distance of 6" to a type (e) non-peaking mercury lamp for 60 seconds. The resultant coating was tack-free and had good mar-scratch resistance. It had an acetone resistance of 51 minutes after aging one day and one hour and 45 minutes after one week.

EXAMPLE XXXVII

A triethylenefumarate was prepared as described in Example XIII except that the propylene glycol was omitted but the ratio of OH:COOH was the same 1.1. A photocuring composition was prepared by mixing 100 parts of this resin with 25 parts styrene, 2 parts of 2% SF1023 silicone in styrene, 1 part CMN and 1 part NSC. This composition was applied to a 4" x 6" wooden panel and exposed to a type (d) 3.5 kw. peaking lamp at a distance of 6" for 60 seconds. The resultant coating was tack-free and showed good mar-scratch resistance.

EXAMPLE XXXVIII

A resin prepared as described in Example XXIII containing a resin:styrene ratio of 56.4:43.6 was sensitized by mixing it with 2% of a 2% solution of GESF 1023 silicone in styrene, 1% CMN and 1% NSC. This composition was applied to a wooden panel (4" x 6") over a regular vinyl primer of the type described in Example IV and exposed at 6" distance for 60 seconds to a type (d) 3.5 kw. peaking lamp. The resulting film was 2 mils thick with no tack and good mar-scratch resistance.

EXAMPLE XXXIX

A resin as described in Example XIX was prepared as described in Example XXIX. This composition was applied to a 4" x 6" wooden panel and exposed to a type (d) 3.5 kw. peaking lamp at 4–6" for 60 seconds. The resultant coating was tack-free and showed good mar-scratch resistance. Acetone resistance after aging one day ranged from 0.5 to 1.0 hour.

In a similar manner other compositions of the type herein described were applied as coatings to various types of substrate in thicknesses from 1 to 12 mils and exposed to lamps of the type previously described in order to form tack-free coatings having good mar-scratch resistance and in most cases good solvent resistance. In general the surface temperature of the coated panel during light curing was within the range from the ambient temperature to 180° F. Regenerated cellulose films as well as metal substrate were used. The invention is especially useful on various kinds of wood panelling including maple, cherry and birch.

In the photocuring examples where the type (d) peaking lamp is a 3.5 kilowatt lamp, the lamp usually contains, in addition to mercury vapor, a small partial pressure of rare gases (e.g., 2 mm. of argon and 20 mm. of xenon) but no getter. The intensity was approximately 0.12 watt/cm.$^2$ measured at 5 inches. The peaking manner of operation converts the current pulses to sharp, high peaks of short duration which intensifies the production of light in the ultraviolet region of the spectrum. Thus, for the purpose of the invention, maximum utilizable light intensity is developed in a minimum period of lamp operation and with low exposure time.

The invention is hereby claimed as follows:

1. A method of coating a substrate with a cured polyester resin film which comprises depositing a liquid film of a nonair inhibited photopolymerizable polyester resin on said substrate to be coated in sufficient amount to form a coating 0.001 to 0.012 inch thickness after drying, and subjecting said film to light waves having wavelengths within the range of 1850 to 4000 angstroms, said liquid film including an ethylenically unsaturated monomer and 0.01% to 5% by weight of the total of a photosensitizer, said light waves having a minimum intensity of at least 0.0034 watt per cm.$^2$ and the light energy delivered to said film by said light waves being sufficient to cure said coating to a mar and scratch resistant finish.

2. A method as claimed in claim 1 in which the light energy is sufficient to give a minimum of two joules per square centimeter delivered to the resin coating.

3. A method as claimed in claim 1 in which said liquid film deposited on said substrate comprises a resin from the group consisting of allyl ether resins, benzyl ether resins, tetrahydrophthalic anhydride resins, endomethylene tetrahydrophthalic anhydride resins, cyclopentadiene and dicyclopentadiene modified resins, acetal resins, tetrahydrofurfuryl resins, and polyalkylene fumarate resins containing at least three alkylene groups, said liquid film including 20% to 60% by weight of the total resin of an ethylenically unsaturated monomer, said liquid film also including 0.01% to 5% by weight of the total of a photosensitizer.

4. A method as claimed in claim 3 in which said ethylenically unsaturated monomer is styrene.

5. A method as claimed in claim 3 in which said resin has an acid value within the range of 5 to 50.

6. A method as claimed in claim 3 in which said resin is an allyl ether resin.

7. A method as claimed in claim 3 in which said resin is a benzyl ether resin.

8. A method as claimed in claim 3 in which said resin is a tetrahydrophthalic anhydride resin.

9. A method as claimed in claim 3 in which said resin is an endomethylene tetrahydrophthalic anhydride resin.

10. A method as claimed in claim 3 in which said resin is a cyclopentadiene modified resin.

11. A method as claimed in claim 3 in which said resin is an acetal resin.

12. A method as claimed in claim 3 in which said resin is a tetrahydrofurfuryl resin.

13. A method as claimed in claim 3 in which said resin is a polyalkylene fumarate resin containing at least three ethylene groups.

14. A process as claimed in claim 1 in which said light waves are produced by a mercury vapor lamp operated by alternating current pulses of a peaked nature.

15. A process as claimed in claim 14 in which the peaks in said current are of such short duration that light is emitted from said lamp during less than 15% of each cycle.

16. A method as claimed in claim 3 in which said resin is a dicyclopentadiene modified resin.

References Cited
UNITED STATES PATENTS

| | | | |
|---|---|---|---|
| 3,511,687 | 5/1970 | Keyl et al. | 117—62 |
| 2,505,067 | 9/1950 | Sachs | 204—159.23 |
| 3,008,242 | 11/1961 | Sites et al. | 117—93.31 |
| 3,052,568 | 9/1962 | Sites et al. | 117—62 |

MURRAY KATZ, Primary Examiner

U.S. Cl. X.R.

117—72, 75, 93.31, 132, 148; 204—159.19

PO-1050
(5/69)

UNITED STATES PATENT OFFICE
CERTIFICATE OF CORRECTION

Patent No. 3,669,716     Dated June 13, 1972

Inventor(s) Alex C. Keyl and Mary G. Brodie

It is certified that error appears in the above-identified patent and that said Letters Patent are hereby corrected as shown below:

Column 1, line 32, "360,350" should read -- 360,359 --.

Column 11, line 52, "furamate" should read -- fumarate --.

Column 12, line 35, "(III) Propylene" should read -- (II) Propylene --; line 36, "Furmaric" should read -- Fumaric --.

Signed and sealed this 26th day of December 1972.

(SEAL)
Attest:

EDWARD M. FLETCHER, JR.            ROBERT GOTTSCHALK
Attesting Officer                  Commissioner of Patents